US012717849B2

(12) United States Patent
Srivastava

(10) Patent No.: US 12,717,849 B2
(45) Date of Patent: Aug. 25, 2026

(54) SCOPED QUERYING USING CUSTOMIZED ARTIFICIAL INTELLIGENCE

(71) Applicant: Zoom Communications, Inc., San Jose, CA (US)

(72) Inventor: Sachin Srivastava, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/420,414

(22) Filed: Jan. 23, 2024

(65) Prior Publication Data

US 2025/0238467 A1 Jul. 24, 2025

(51) Int. Cl.

| | |
|---|---|
| ***G06F 16/93*** | (2019.01) |
| ***G06F 16/9032*** | (2019.01) |
| ***G06F 16/9038*** | (2019.01) |
| ***G10L 15/183*** | (2013.01) |
| ***H04L 51/046*** | (2022.01) |

(52) U.S. Cl.

CPC ........ *G06F 16/93* (2019.01); *G06F 16/90332* (2019.01); *G06F 16/9038* (2019.01); *G10L 15/183* (2013.01); *H04L 51/046* (2013.01)

(58) Field of Classification Search

CPC ............... G06F 16/93; G06F 16/90332; G06F 16/9038; G10L 15/183; H04L 51/046

See application file for complete search history.

(56) References Cited

U.S. PATENT DOCUMENTS 11,080,356 B1 * 8/2021 Kumar ................ G06F 16/9577
11,303,848 B2 * 4/2022 Matula .................. G06V 20/40
11,894,940 B2 * 2/2024 Rensfelt ................. G06Q 10/06
11,914,644 B2 * 2/2024 Miller ...................... H04N 7/15
12,041,098 B2 * 7/2024 B M S ................ H04L 65/1089
12,141,536 B1 * 11/2024 Khosla .................. G06F 40/126
12,321,383 B2 * 6/2025 Miller .................. G06F 3/0484
2022/0353211 A1 11/2022 White
2023/0282218 A1 * 9/2023 Moynihan ............ G06F 16/433 704/235
2024/0129432 A1 * 4/2024 Harb ...................... H04N 7/152
2024/0249162 A1 * 7/2024 Paiuk ....................... G06N 5/04

OTHER PUBLICATIONS

International Search Report and Written Opinion for PCT/US2024/060484 mailed May 9, 2025.

* cited by examiner

*Primary Examiner* — Debbie M Le

(74) *Attorney, Agent, or Firm* — Kilpatrick Townsend & Stockton LLP

(57) ABSTRACT

Techniques for scoped querying using customized artificial intelligence are provided. In an example method, a computing device determines a set of documents about a user of a first client device of a plurality of client devices. The computing device integrates the set of documents into a datastore, the datastore accessible by a machine learning model trained to respond to natural-language queries in the context of the set of documents. The computing device receives, from a second client device of the plurality of client devices, a query about the first user of the first client device and then receives, from the machine learning model, a response to the query based on the set of documents. The computing device outputs the response to the second client device.

20 Claims, 10 Drawing Sheets

600
610
615
620
625
630
640
650
660
670
Search
Meetings
Team Chat
Phone
Revenue
Clips
Calendar
More
Info KPNSOwn
EXTERNAL
Info KPNSOwn
Available
Ask Me
Chat
Meet
SMS
Call
Home
Contact
10:21 PM
Send a quick chat message...
Chats
Channels
Meeting Chats
Huddle Channels
Apps
External user(x) present
Message Info KPNSOwn

SCOPED QUERYING USING CUSTOMIZED ARTIFICIAL INTELLIGENCE

FIELD

The present application generally relates to machine learning, and more particularly relates to techniques for scoped querying using customized artificial intelligence.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
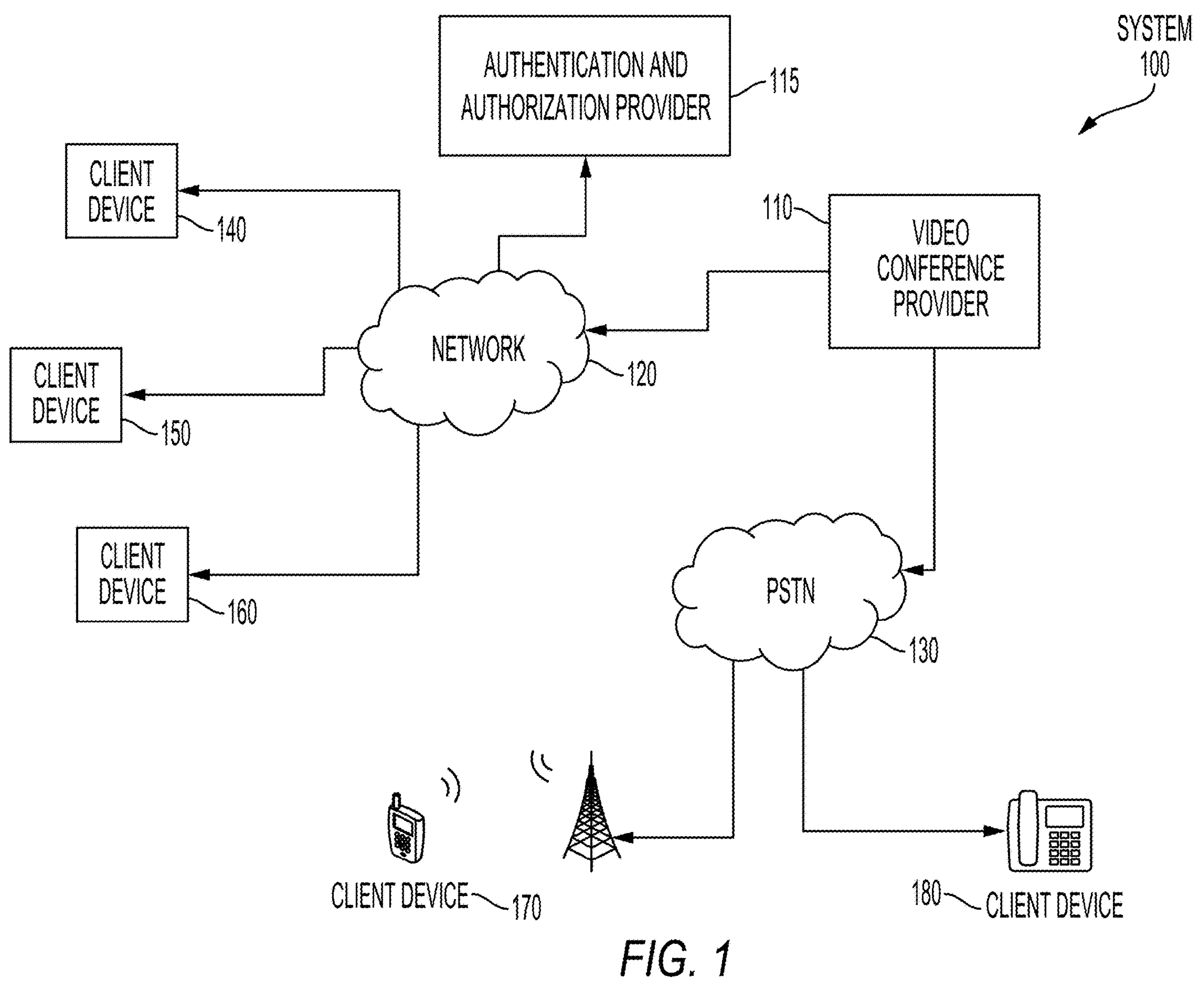
FIG. 1 shows an example system that provides videoconferencing functionality to various client devices, according to some aspects of the present disclosure.

Examples are described herein in the context of techniques for scoped querying using customized artificial intelligence. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Some modern video conference providers offer a suite of services to users including video conferencing, chat, whiteboarding, document management, email, calendaring, and so on. In this respect, the video conference provider acts as a hub for communications of many types. For example, in an enterprise setting, members of an organization may use client software provided by a video conference provider for communications across the organization, replacing the need for multiple, disparate applications to accomplish these functions ad hoc.

In some examples, the client software provided by the video conference provider may include features that can be used to contact other users. For example, a user of the client software can use a control or series of controls to initiate a video conference or a chat conversation with another user. In another example, a user can use a control to access profile information about another user, in the case where the other user has explicitly enabled the sharing of such information.

One scenario that can occur in an organization or group setting is the asking of repetitive questions or of questions whose answer is readily available in publicly available documentation. For example, a new employee might ask common questions such as the location of certain office destinations (e.g., a conference room) or the time of a scheduled meeting. In another example, a team member may ask a supervisor how to configure a piece of software required for team members. In both of these and other similar examples, the questions could be answered on the basis of publicly available documents or through documents that the answerer intends to make available to the asker.

Valuable time can be lost through the repeat asking of similar questions. Moreover, replies can be missed due to the unavailability of the answerer. The answerer may not have the appropriate reference material readily available and can spend even more time finding it every time the same or a similar question is asked. Accuracy can also be sacrificed when information is quickly provided over chat or direct messaging in the fast-paced, busy office environment. Answering questions whose answer is already publicly available, especially repetitively, can be frustrating and affect job satisfaction. These examples and others illustrate the social and intellectual costs of directing queries to humans with large demands on their time. Computing and network resources are likewise expended on repetitive exchanges.

These difficulties can be addressed using techniques for scoped querying using customized artificial intelligence. For example, a machine learning (ML) model can be trained to respond to natural-language queries in the context of a particular set of documents. In this context, the term "documents" refers generally to any stored information that is accessible or made accessible to the ML model. For example, the particular set of documents may be a "knowledge base" generated by a user such as emails, chat messages, wiki pages, profile information, and so on. The subjects included in the set of documents define the scope of the possible responses. For example, the ML model can be configured to respond to queries on behalf of the user using, for example, a chatbot. The chatbot can respond to the queries as the user would, given the information in the set of documents and other publicly available information.

The following non-limiting example is provided to introduce certain embodiments. In one embodiment, a computing device determines a set of documents about a user of a client device of a number of client devices. For example, the user may use an interface provided by the client device to designate a set of documents for use by an ML model trained to respond to natural-language queries in the context of the set of documents. The ML model may be, for example, a large language model (LLM) such as Generative Pre-trained Transformer (GPT)-4 or the like. The user may designate documents on the client device, on other devices, on the Internet, at remote storage locations, and other identifiable locations. The documents can be of any type suitable for processing by the ML model. For example, the designated documents may include images, videos, text documents, among others.

The computing device integrates the set of documents into a datastore, which is accessible by the ML model. For example, the set of documents can be copied or referenced from a database incorporated into or otherwise accessible by the LLM. The LLM can be configured to use the database for responding to queries. For instance, the ML model can be further trained or "fine-tuned" using the set of documents. In another example, a retrieval-augmented generation (RAG) technique can be used to influence the output of an LLM, so it that it references the set of documents, that may not contained in original training data of the LLM, before generating a response.

The computing device receives, from another client device, a query about the user of the client device. The query may be input into a chatbot or other similar chat interface. The query may be a natural-language query about the user such as "When are you available to meet tomorrow," "Where did you say the webpage for the new hire wiki is," or "What do you think about the new policy?" The query may be one that is directed to the user of the client device or one that is based on information known to the user of the client device.

The computing device receives, from the ML model, a response to the query, wherein the response is based on the set of documents. In the example of an ML model that is an LLM, the LLM may reply to the example queries given above with answers based on the set of documents such as "It looks like I have openings at 3 and 5," "It's at http://example.com/wiki," or "I'm only a language model and cannot speculate about what [the user] thinks about the new policy. However, here is a list of pros and cons of the new policy." The query response may be configured to reproduce the tone, rhythm, and voice of the user of the client device in addition to being based on the information in the set of documents.

The computing device outputs the response to the other client device. For example, the response may be output to the chatbot, similar to how a response to a chat query can be received. The response output to the chatbot can be accompanied by information or warning text indicating the response was generated by an ML model. However, the user experience of the querying user may be caused to be similar to the user experience of chatting or conversing with the user of the client device.

Other scopes are possible, as defined by the content and subject matter of the set of documents. For example, one example computing device can receive a set of documents relating to a particular project. The computing device can be associated with a "dummy" user profile which querying users can use to query the computing device about the project. In another example, the computing device can receive a set of documents relating to a topic and respond to queries about that particular topic or topics.

The innovations of the present disclosure provide can provide improvements to the functioning of a computing system. The time and energy of knowledgeable members of organizations and groups is valuable. Taking measures to preserve those resources can translate directly into reduced consumption of computing processing and memory. For example, less repeat network traffic based on repetitive, verbose, and potentially large queries and response can result in reduced consumption of processing resources and network congestion. Repeat network traffic can be similarly avoided because questions need not be re-posed when the responder is unavailable. Computing storage resources are preserved through the marshalling of the information in the set of documents in a datastore accessible by the ML model, reducing the need for redundant, dispersed copies of certain documents and, further, alleviating some problems relating to version control.

These illustrative examples are given to introduce the reader to the general subject matter discussed herein and the disclosure is not limited to these examples. The following sections describe various additional non-limiting examples of systems and methods for scoped querying using customized artificial intelligence.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
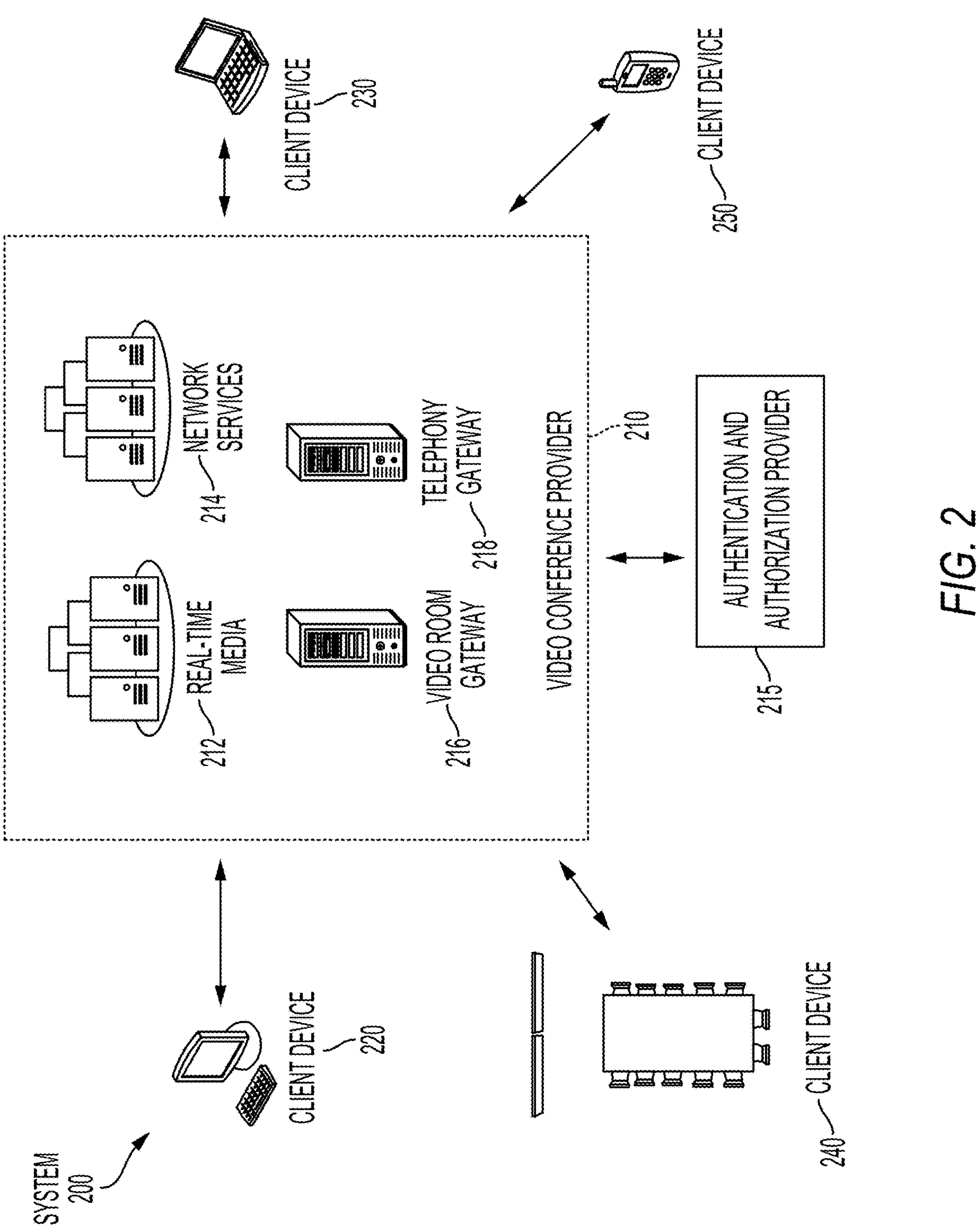
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
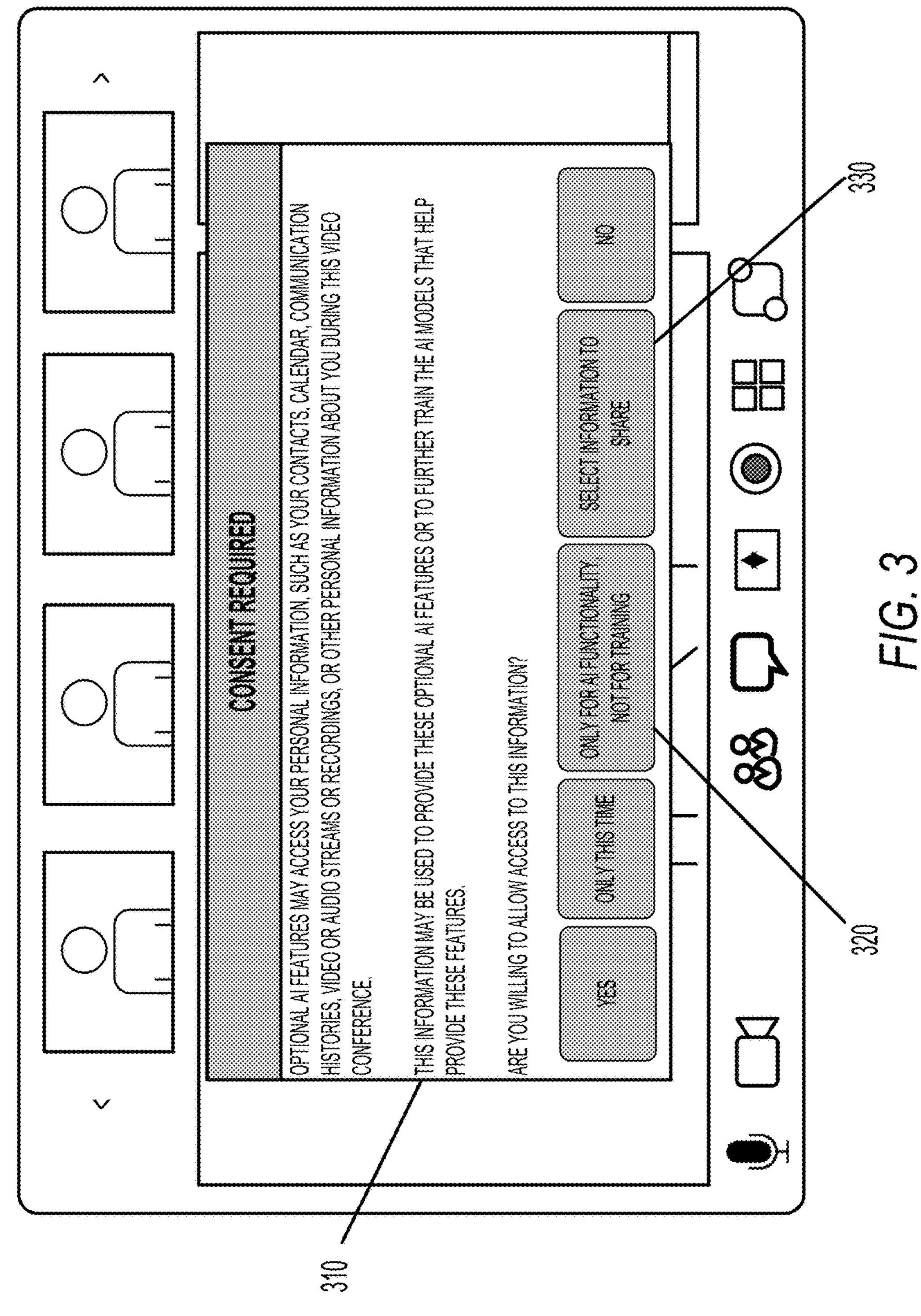
FIG. 3 shows an example user interface that may be used in some example systems configured for techniques for scoped querying using customized artificial intelligence, according to some aspects of the present disclosure.

Turning next to FIG. 3, FIG. 3 shows an example user interface 300 that may be used in some example systems configured for scoped querying using customized artificial intelligence. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
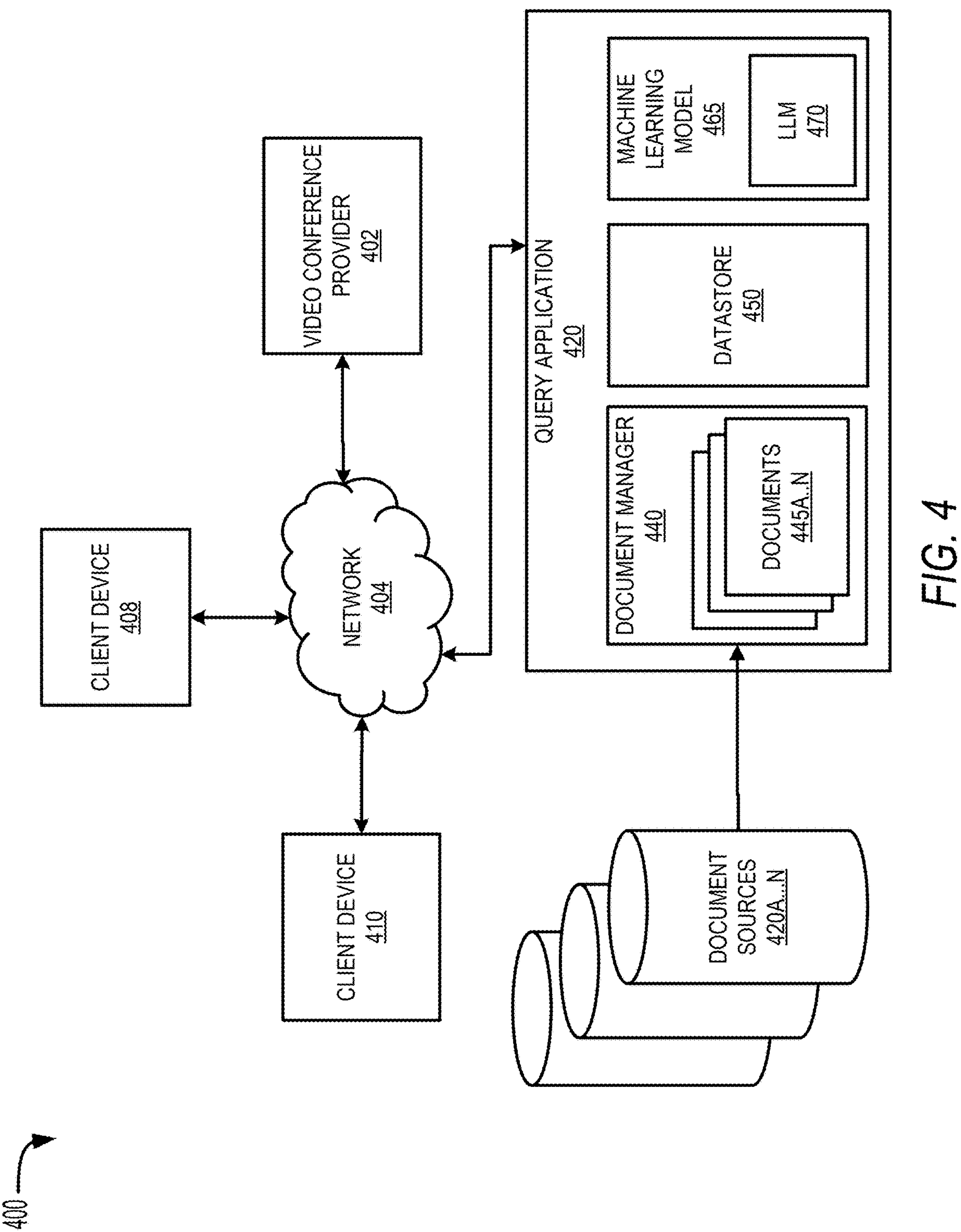
FIG. 4 shows an example of a system implementing scoped querying using customized artificial intelligence, according to some aspects of the present disclosure.

Referring now to FIG. 4, FIG. 4 shows an example of a system 400 implementing scoped querying using customized artificial intelligence. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for scoped querying using customized artificial intelligence. For example, the client devices 408, 410 may be laptops, desktops, smartphones, tablets, internet protocol (IP) phones, and so on. In another example, the client devices 408, 410 can execute client software provided by the video conference provider 402 for accessing services such as video conferencing, chat, email, calendaring, and so on. In this example, the client software provided by the video conference provider 402 may include features for scoped querying using customized artificial intelligence. For instance, interfaces for inputting queries may be provided as part of a video conferencing user interface, such as a feature for chatting with other video conference participants.

In the example configuration depicted, system 400 includes a query application 420 that includes components for receiving a designated set of documents relating to a user, managing a datastore accessible by a machine learning (ML) model such as a large language model (LLM), and the ML model itself. The query application 420 may be a standalone application executing on a standalone server or servers, a component of the video conference provider 402, hosted in a cloud computing environment, or in another suitable configuration.

Query application 420 includes a document manager 440. The document manager 440 can, for example, provide an interface for designating documents that can be used by the query application 420 to determine the documents about the user of the client device 410. For example, the document manager 440 may expose a web API or web-based graphical user interface (GUI) that can be accessed by the client devices 408, 410 to designate, identify, upload, or otherwise prepare documents for integration into the datastore 450.

Document manager 440 receives documents from a number of document sources 420A . . . N. The documents can include any stored information that is accessible or made accessible to the ML model 465. Examples of document sources 420A . . . N include the Internet, databases, wikis, email servers, chat channels, document stores, and so on. The document manager 440 may be integrated with one or more document sources 420A . . . N such that a user of a client device 408, 410 can easily browse and designate or exclude documents for inclusion in the set of documents. The default behavior, in some examples, may be to exclude documents until they are explicitly designated for inclusion in the set of documents.

In some examples, the documents thus designated can be copied or uploaded to the document manager 440. In system 400, the document manager 440 includes documents 445A . . . N. The documents 445A . . . N may be stored in a documents database hosted by the document manager 440 or externally using, for example, a cloud storage provider. In some other examples, the documents may be designated and included in the set of documents by reference. For instance, a location on the Internet such as a webpage identifiable using a Uniform Resource Locator (URL) can be included among the documents 445A . . . N as a reference to the URL.

The content or subject matter of the set of documents defines the scope or scopes of the query/response interactions that a particular system 400 is configured to handle. In some examples, queries may about a particular user or about information known to a particular user. In that example, the scope may include documents selected by the particular user to reflect the particular user's knowledge, experience, memory, personality, and so on. In another example, queries may be about a particular project or event. The set of documents can be likewise selected by an administrator to reflect the details of the project or event.

Query application 420 includes a datastore 450. The datastore 450 may be a database hosted by the document manager 440 or hosted externally using, for example, a cloud storage provider, or a suitable combination of thereof. In some examples, a database can be shared between the document manager 440 and the datastore 450 for efficiency and to reduce redundancy.

The datastore 450 includes information accessible by the ML model 465. The ML model 465 can be trained to respond to natural-language queries based on the set of documents, which can be integrated into the datastore 450. For example, the ML model 465 may be an LLM 470 trained on large amounts of training data hosted in the datastore 450 to answer natural-language queries.

In another example, the LLM 470 can be a pre-trained model that can be augmented with additional data for responding to natural-language queries about specific subjects that may not be included in a generalized training data set. Techniques such as fine-tuning or retrieval-augmented generation can be used in concert with accessing the information in the datastore 450, such as the set of documents. The information from the set of documents can then be incorporated into query responses.

The set of documents identified or designated by the user of the client device 410 can be integrated into the datastore 450 using an integration technique such as by query (e.g., SQL insert), an extract-transfer-load (ETL) procedure, direct upload, and so on. Upon integration into the datastore 450, the ML model 465 may be caused to initiate a re-training or fine-tuning process that incorporates the information in the new or newly updated set of documents into ML model outputs.

Query application 420 includes an ML model 465 that may include an LLM 470. For example, the ML model 465 may itself be an LLM 470 or it may be a combination or ensemble ML model 465 incorporating several model types. For instance, an encoder neural network may be used in conjunction with an LLM 470 in some examples. In examples including an LLM 470, the ML model 465 can include an LLM 470 such as one based on Generative Pretrained Transformer (GPT)-3 or -4, Bidirectional Encoder Representations from Transformers (BERT), and Turing-Natural Language Generation (NLG).

Any suitable ML model type may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs") or may employ autoencoders ("AEs") in conjunction with ML models, such as AEGANs or variational AEGANs ("VAEGANs").

Figure 5:
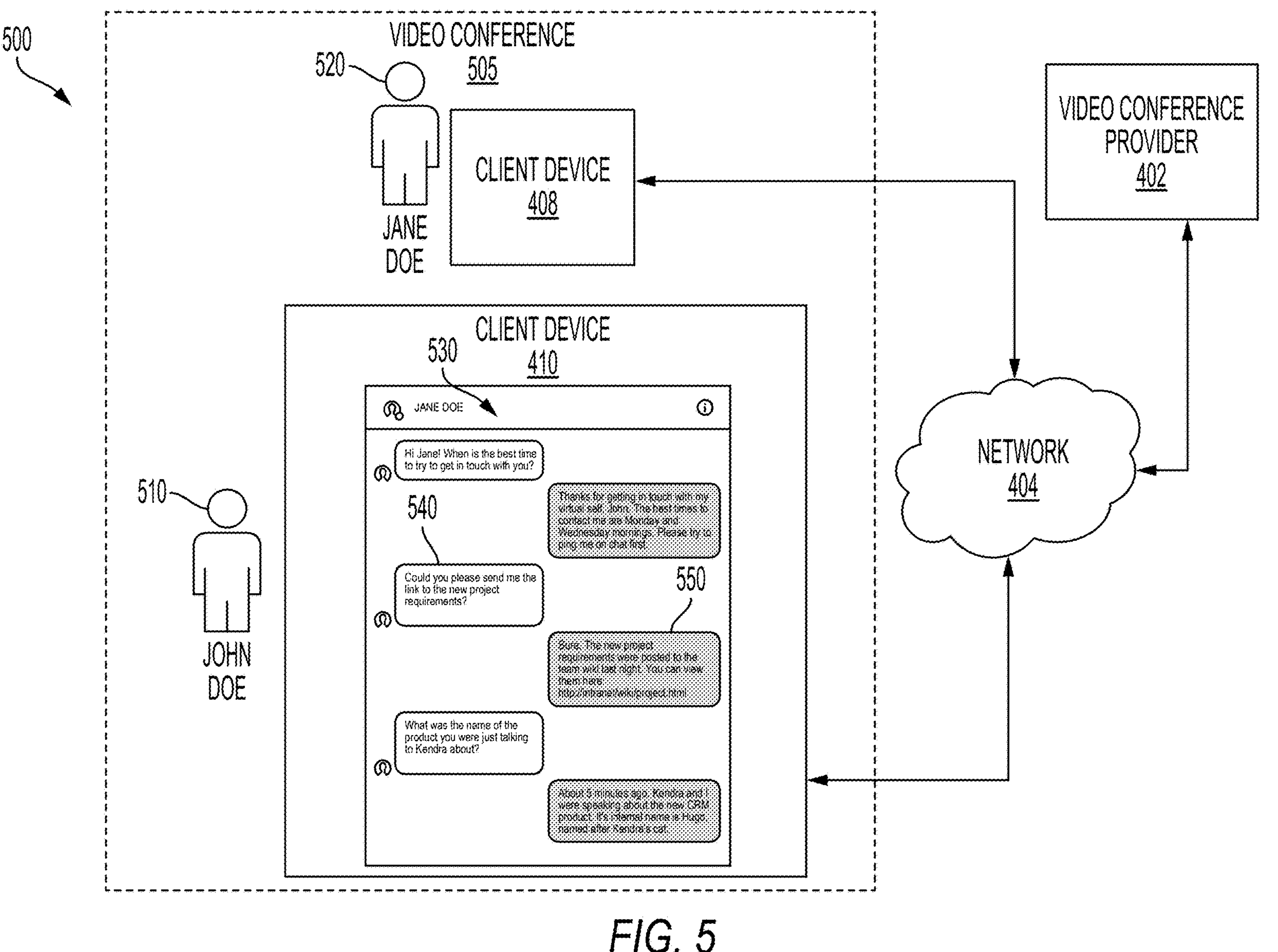
FIG. 5 shows an example of a system implementing scoped querying using customized artificial intelligence, according to some aspects of the present disclosure.

Referring now to FIG. 5, FIG. 5 shows an example of a system 500 implementing scoped querying using customized artificial intelligence. System 500 illustrates a query/response interaction between a user 510 of client device 410 and a chatbot representing user 520 of client devices 408. The example query/response interaction depicted takes place during a video conference 505, illustrated using a dotted line.

The client device 410 includes an example chat interface 530. The chat interface 530 shows an example of what user 510 of client device 410 may see when querying user 520 of client device 408 using scoped querying using customized artificial intelligence. In this example, the query application 420 (not shown) may be a component of the video conference provider 402. The video conference provider 402 receives, from client device 410, a query 540 about user 520 of client device 408. The video conference provider 402 can relay the query to a suitable ML model 465 and then receive, from the ML model 465, a response 550 to the query 540. The response 550 is based on the set of documents, as illustrated. For instance, the query 540 concerns a link to project requirements and the response 550 includes the link. This example highlights the fact that the response 550 includes information that would not otherwise be available in a pre-trained ML model 465 trained using, for example, publicly available data, since intranet links would be unlikely to be contained in such a training dataset. Several other example queries and responses are shown.

In some examples, the set of documents may include information about the video conference 505. For example, the information about the video conference 505 can include a transcript of the video conference 505. The transcript may be maintained in real-time or near-real-time such that it is periodically updated during the video conference 505. The transcript thus updated can be included in the information used to respond to queries by the ML model 465 such that query responses in response to queries during the video conference 505 may include information about the in-progress video conference 505. This capability may be used, for example, by another user (not shown) with a client device not participating in the video conference 505 to query the user 520 of client device 408 during the video conference.

While FIG. 5 depicts the query/response interaction in the context of a video conference 505, in other examples a similar interface can be used with other applications and functions of the client software executing on client device 410. For example, the video conference provider 402 can join the client device 410 to a chat channel. For instance, the user 510 may be provided with a GUI 600 similar to the one described below with respect to FIG. 6.

A component of the query application such as the document manager 440 can determine a set of public chat channels that include the client device 410. For example, the document manager 440 can receive information about subscribed chat channels for user 510 from the video conference provider 402. The document manager 440 can then access, from the set of public chat channels, chat information such as chat messages, attachments, threads, group threads, and so on, provided that explicit consent or designation of that chat information has been indicated by the user 510. As with the set of documents, the chat information can be integrated into the datastore 450. Responses to queries can then be further based on the chat information. For instance, if user 510 and 520 discuss a project in a chat channel, the discussion about the project may be later available for a scoped query using customized artificial intelligence, following integration of the discussion into the datastore 450.

Figure 6:
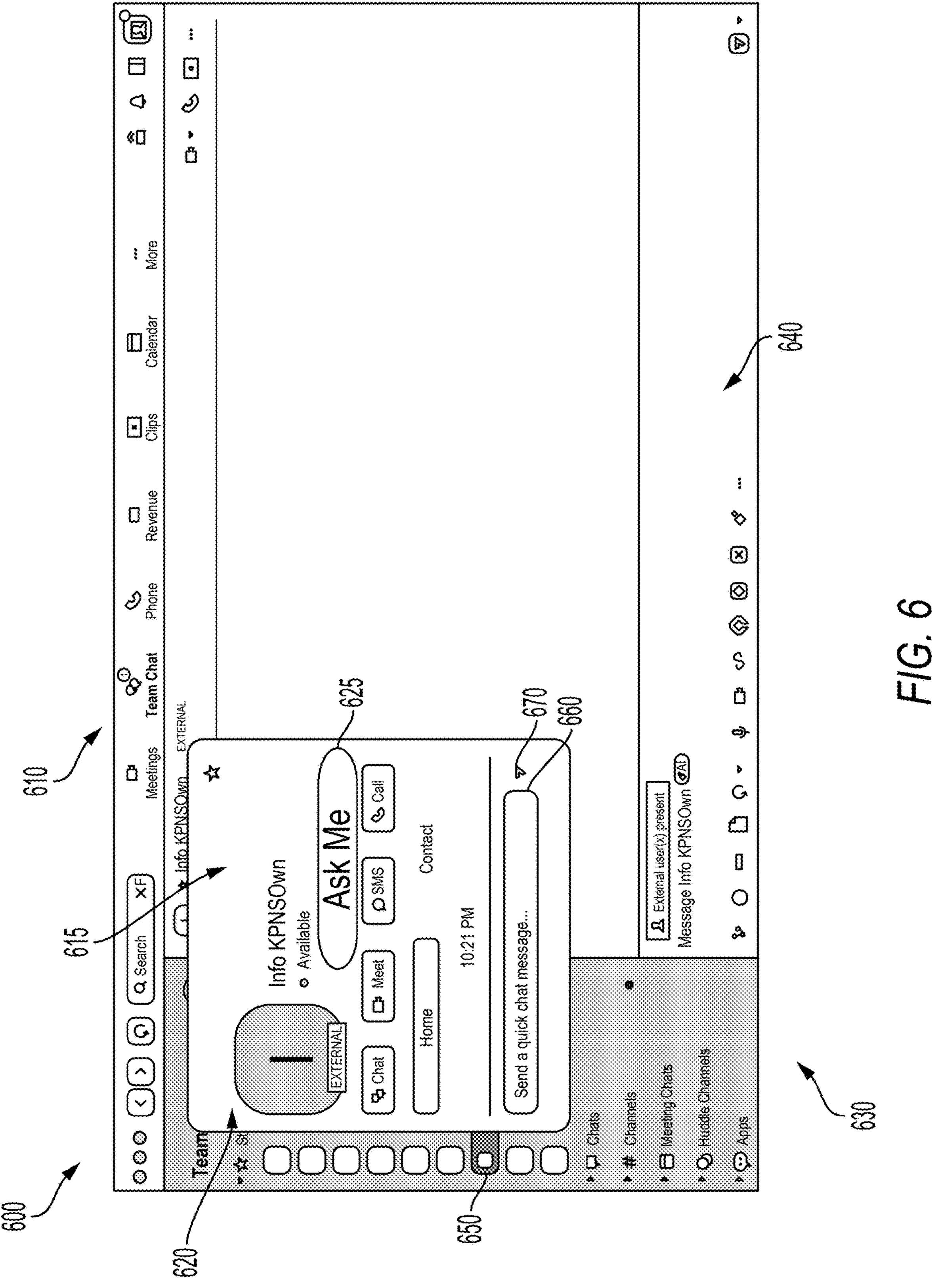
FIG. 6 shows an example of a graphical user interface as may be used in a system implementing scoped querying using customized artificial intelligence, according to some aspects of the present disclosure.

Referring now to FIG. 6, FIG. 6 shows an example of a graphical user interface (GUI) 600 as may be used in a system implementing scoped querying using customized artificial intelligence, such as system 400 as described above with respect to FIG. 4. GUI 600 depicts a chat interface as may be shown by a client device 410 executing client software provided by a video conference provider 402. However, the user profile interface 615 discussed below may be included with other components of the client software such as video conferencing, calendaring, whiteboarding, and so on.

The chat interface is shown as the selected function among the top-level controls 610. The example top-level controls 610 shown include controls for selecting the function of the client software such as chat, video conferences, and so on. The example top-level controls 610 also include a search bar and window controls. Other top-level control 610 configurations are possible. The GUI 600 also includes a chat navigation bar 630. The chat navigation bar 630 includes controls for quickly accessing various users, in-progress chats, chat channels, meeting notes, chat applications, and so on. The GUI 600 also includes a chat bar 640 including functions for sending, editing, and deleting chat messages, among other possible functions.

Figure 7:
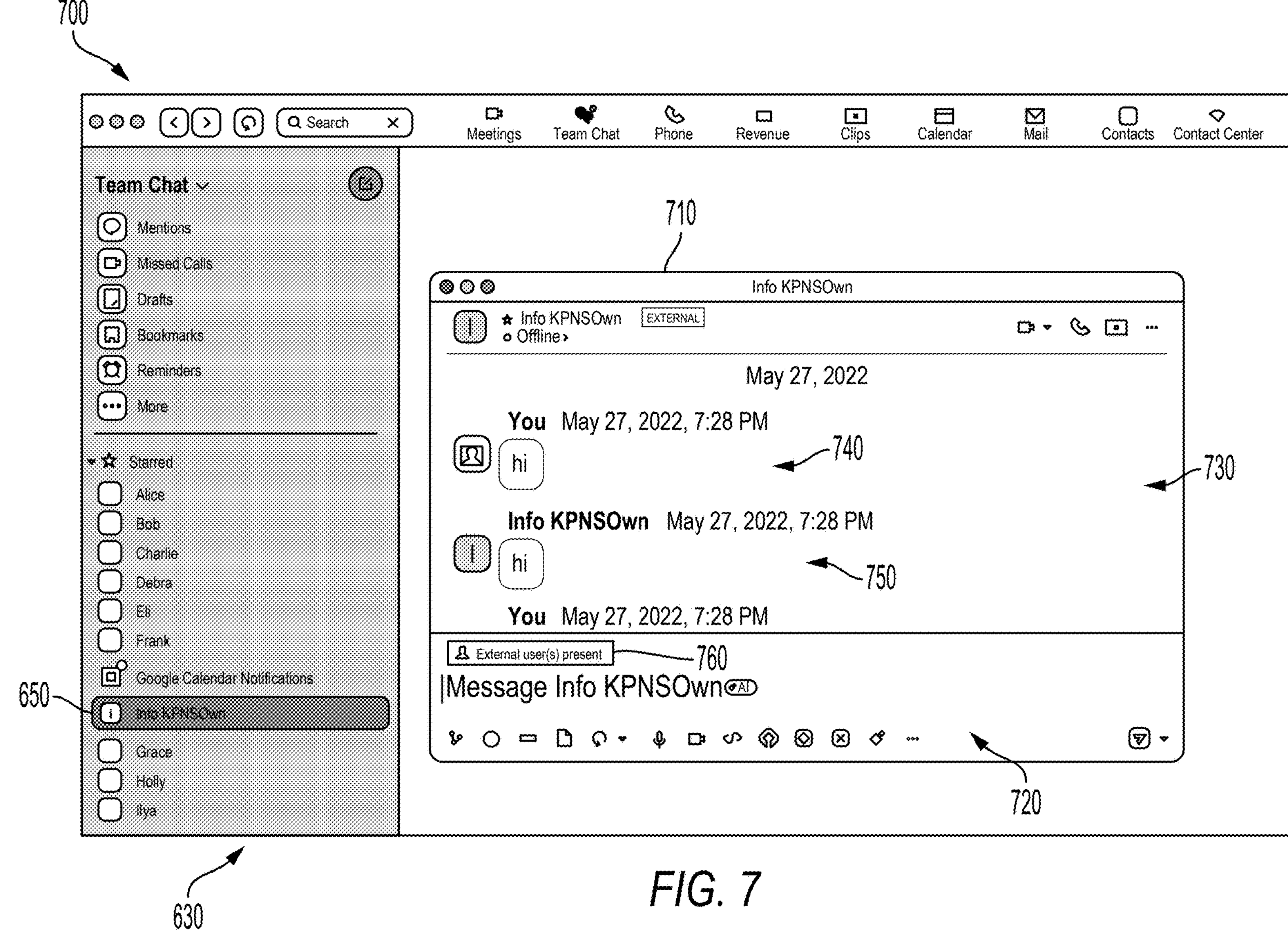
FIG. 7 shows another example of a graphical user interface as may be used in a system implementing scoped querying using customized artificial intelligence, according to some aspects of the present disclosure.

In the example shown, a user selection 650 has been made in the chat navigation bar 630. As a result, the user profile interface 615 is shown. The user profile interface 615 includes user profile controls 620 such as buttons for chatting or starting a video conference with the target user. The user profile interface 615 includes a control for initiating scoped querying using customized artificial intelligence or an "ask me" button 625. The ask me button 625 can cause a query interface to be displayed as shown in FIG. 7 below. The user profile interface 615 also includes a query bar 660 and query send button 670 for using a scoped query using customized artificial intelligence without using the query interface. In this case, the query may be posed using the query bar 660 and query send button 670, which may then cause the query interface to open with the initial query pre-populated and already undergoing processing for response.

Referring now to FIG. 7, FIG. 7 shows another example of a graphical user interface (GUI) 700 as may be used in a system implementing scoped querying using customized artificial intelligence, such as system 400 as described above with respect to FIG. 4. Similar to FIG. 6, in GUI 700, a user selection 650 has been made in the chat navigation bar 630. Upon receiving an indication of user selection 650, the client device 410 may be caused to show query interface 710. Query interface 710 is another example of a chat interface that may be used for scoped querying using customized artificial intelligence, as an alternative to the example depicted in FIG. 5.

Query interface 710 includes a chat area 730 and a chat bar 720 including functions for sending, editing, and deleting chat messages, among other possible functions. Chat area 730 includes a query 740 and a response 750. The query interface 710 may include a warning 760 indicating that the chat interaction taking place in the query interface 710 is with an ML model 465 or other artificial intelligence.

Figure 8:
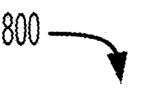
FIG. 8 shows a flowchart of an example method for scoped querying using customized artificial intelligence, according to some aspects of the present disclosure.
Figure 8:
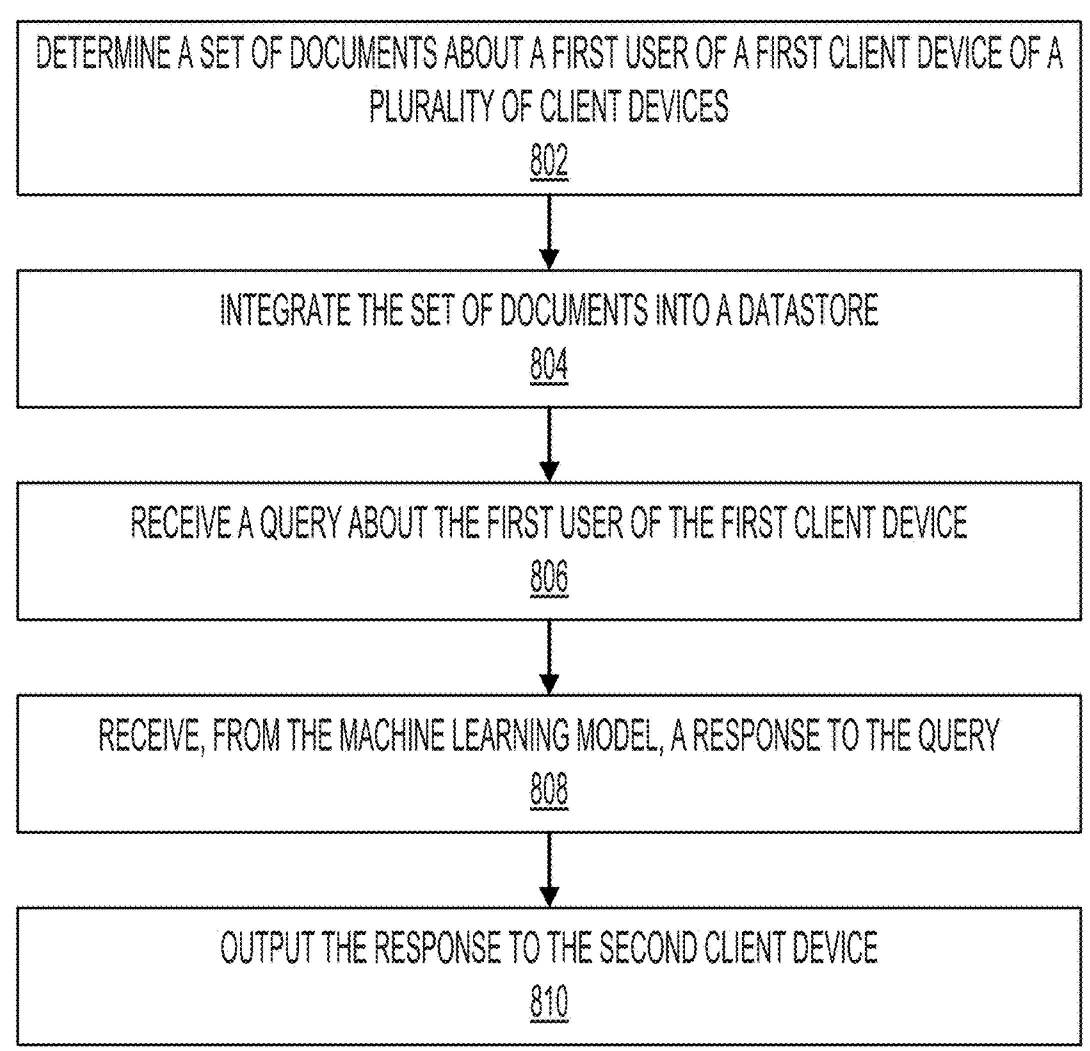

Referring now to FIG. 8, FIG. 8 shows a flowchart of an example method 800 for scoped querying using customized artificial intelligence. The description of the method 800 in FIG. 8 will be made with reference to FIGS. 4-7, however any suitable system according to this disclosure may be used, such as the example systems 100 and 200, shown in FIGS. 1 and 2. It should be appreciated that method 800 provides a particular method for scoped querying using customized artificial intelligence. Other sequences of operations may also be performed according to alternative examples.

For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For example, the description is given from the perspective of the query application 420 but other configurations are possible. One of ordinary skill in the art would recognize many variations, modifications, and alternatives.

The method 800 may include block 802. At block 802, the query application 420 determines a set of documents about a first user of a first client device of a number of client devices. For example, the set of documents may be determined based on an identification or designation of the set of documents by the user of the first client device. The user may, for instance, use a tool provided by the query application 420, as described with respect to FIG. 4, to select, identify, manage, or upload documents.

The documents can include any stored information that is accessible or made accessible to the ML model 465. Accordingly, the set of documents can include any document that is accessible or indexable by the ML model 465. For example, the set of documents may include emails, chat messages, video conference transcripts, or wiki pages. In addition, the set of documents may include audio, music, videos, video transcripts, images, image captions, word processing documents, calendar documents, program code, and so on. In general, the set of documents can include any document that the user of the first client device desires the ML model 465 to base responses on, in lieu of the user themselves.

The set of documents may include, for example, documents generated by the first user of the first client device. This illustrates the definition of the scope of the possible responses. The query application 420 can likewise be configured with one or more sets of documents defining an additional scope or scopes. For instance, distinct sets of documents can be designated for various users, each of which can define a unique scope for responding to queries about the respective users.

In some examples, the selection of documents by a user may include designation of both internal and external documents. In this context, internal documents can refer to documents including information that is confidential to an organization or group. In contrast, external documents can refer to documents that are not confidential to an organization or group, and thus include information that can be publicly shared outside the organization or group.

In that case, the ML model 465 can be configured, as will be described in more detail below in block 808, to determine whether the querying client device is an internal or external client device, and then to respond to the query using the appropriate subset off the set of documents. For example, the ML model 465 could be configured to respond based on both internal and external documents to a client device that is internal to an organization or group. Likewise, the ML model 465 could be configured to respond based only on the external documents to a client device that is external to the organization or group. Classifying the querying client device as internal or external can be performed based on an allow- or deny-list, geolocation of IP address, authentication information, and so on.

This example refers to documents that are internal and external to an organization or group, but other classifications of documents can be similarly to partition the basis of the response generated by the ML model 465. For instance, documents could be partitioned according to specific allowance or denial criteria (e.g., specific documents for specific users or groups), security classifications, location, job role, and so on.

At block 804, the query application 420 integrates the set of documents into a datastore 450, the datastore 450 accessible by the ML model 465 trained to respond to natural-language queries based on the set of documents. For example, the set of documents can be used in concert with fine-tuning of the ML model 465 or retrieval-augmented generation. In retrieval-augmented generation, integrate information from the datastore 450 can be combined with the input query to provide enriched context for generating a response.

In some examples, the datastore 450 or other component of the query application 420 may receive an indication of an update to a document in the set of documents. For example, a wiki page may be updated or the transcript of an in-progress video conference may be amended. The update set of documents may then be reintegrated into the datastore 450. For instance, for an ML model 465 using fine-tuning, the ML model 465 may need to be re-trained or additionally trained using the updated documents.

At block 806, the query application 420 receives, from a second client device of the number of client devices, a query about the first user of the first client device. For example, the query about the first user of the first client device may be input to a chat interface exposed by client software provided by the video conference provider 402. For instance, the chat interface can be a part of a user profile application, as described above with respect to FIGS. 6 and 7, part of a chat function used in a video conference or whiteboard, or a standalone feature, among other possible configurations. FIG. 5 depicts another embodiment of a chat interface 530 used in some examples.

In some examples, the query about the first user of the first client device may be addressed to the first user of the first client device. In this case, the chat interface for chatting with the first user and "chatting" with a system providing scoped querying using customized artificial intelligence may be similar in appearance. In this sense, the query is "addressed" to the first user. The query is processed, however, by the ML model 465 and may in some cases may not be seen by the first user at all.

An illustrative example involves a user of the second client device with an upcoming meeting with the user of the first client device. A user interface such as the user profile interface 615 or a calendar interface may include a "Prepare for Meeting" control or button based on a determination that the second client device has an upcoming meeting with the user of the first client device based on information obtained from the first or second users' calendars. The "Prepare for Meeting" control may cause an interface such as the query interface 710 to be displayed to the second user.

In this example, the query interface 710 may include additional contextual information for use by the second user during the authoring of the query. For example, the contextual information can include information such as past meeting summaries, topics covered during past meetings, upcoming projects, etc. to provide a basis for asking an appropriately scoped question. The contextual information may be based on the set of documents.

At block 808, the query application 420 receives, from the machine learning model, a response to the query, in which the response is based on the set of documents. For example, following receipt of the query from the first user of the first client device, the query application 420 may relay the query to the ML model 465. After a short period of time (e.g., 10-20 seconds) during which the ML model 465 processes and generates a response to the query, the response is output to the requesting client program. In some examples, the ML model 465 can be accessed by client applications such as the query application 420 using a web-based application programming interface (API). For instance, the ML model 465 may be a commercially available pre-trained LLM 470 that can be accessed over the network 404 using a suitable API.

In some examples, the query application may determine that the query is about a document that is not included in the set of documents. For example, the query may concern a private subject about which information was deliberately excluded from the set of documents. In this case, the response can include a refusal to answer the query based on the document not being included in the set of documents. For instance, if a query asks for information about Project X, which is a confidential project that the asking user is not involved, in one example the response can be "I'm sorry, I can't provide that information. Please contact the user directly if you have any questions."

At block 810, the query application 420 outputs the response to the second client device. For example, the response from the ML model 465 may be output to the chat interface. As before, the response from the ML model 465 can be "addressed" to a second user of the second client device, to give an appearance of a chat conversation between two humans. In this respect, the chat interface is intended to simulate a chat conversation between the first user and the second user; in reality, the chat conversation is between the second user and the query application 420.

In the illustrative example above, a query such as "remind me about we talked about during our last meeting" could be answered, on the basis of the set of documents, with an answer such as "We talked about the upcoming project and the tasks you would be assigned to. We agreed that your team would be well-suited for the user interface tasks." In this example, the query application 420 responds in the first-person to cause a subjective appearance of chatting with the user of the first client device, but the query application 420 can be configured to respond in other particular voices, tenses, and tones.

Blocks 806 through 810 describe a query about the first user of the first client device. However, the techniques disclosed herein for scoped querying using customized artificial intelligence can have scopes other than the first user. The set of documents defines the scope of the responses given by the ML model 465. For example, the query could be regarding a specific subject or topic, a collection of topics, a particular reference, and so on. In each case, the chat interface described above could be used to facilitate a query/response interaction between the second user ang the ML model 465, responding as another human might response; in reality, again, the chat conversation is between the second user and the query application 420.

In some examples, the query may be directed to the first user of the first client device. The query application 420 can determine that the first user of the first client device is not available and direct the query to the ML model 465 response. In this example, the query application 420 may be configured to allow the first user to respond when they are available or have otherwise indicated availability but to then default to a response from the ML model 465 otherwise. Other configurations are possible. For instance, the query application 420 can be configured to direct queries to the ML model 465 initially but to then direct queries to the first user if the ML model 465 is unable to respond adequately to the query.

Figure 9:
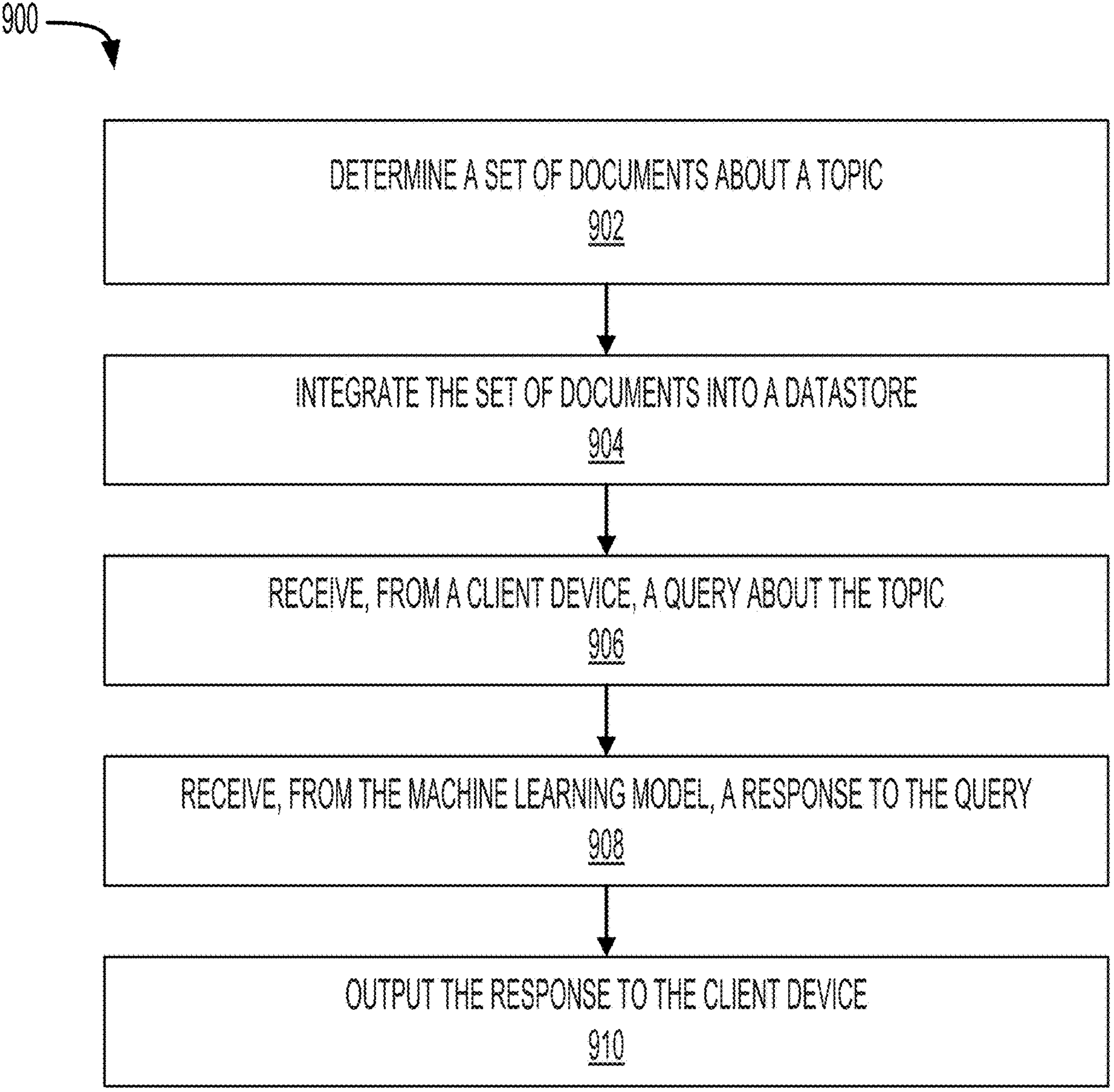
FIG. 9 shows a flowchart of another example method for scoped querying using customized artificial intelligence, according to some aspects of the present disclosure.

Referring now to FIG. 9, FIG. 9 shows a flowchart of another example method 900 for scoped querying using customized artificial intelligence. The description of the method 900 in FIG. 9 will be made with reference to FIGS. 4-7, however any suitable system according to this disclosure may be used, such as the example systems 100 and 200, shown in FIGS. 1 and 2. It should be appreciated that method 900 provides a particular method for scoped querying using customized artificial intelligence. Other sequences of operations may also be performed according to alternative examples.

For example, alternative examples of the present disclosure may perform the steps outlined above in a different order. Moreover, the individual operations illustrated by method 900 may include multiple sub-operations that may be performed in various sequences as appropriate to the individual operation. Furthermore, additional operations may be added or removed depending on the particular applications. Further, the operations described in method 900 may be performed by different devices. For example, the description is given from the perspective of the query application 420 but other configurations are possible. One of ordinary skill in the art would recognize many variations, modifications, and alternatives.

The method 900 may include block 902. At block 902, the query application 420 determines a set of documents about a topic. Similar to block 802 above, the set of documents may be determined based on an identification or designation of the set of documents by a user of a client device. The user may, for instance, use a tool provided by the query application 420, as described with respect to FIG. 4, to select, identify, manage, or upload documents relating to the topic. In this case, however, the user is an organizational administrator or manager that is configuring the query application 420 for responding to queries that are scoped to particular topics. For example, the user may determine documents relating to topics such as upcoming meetings, organizational news, organizational policies, and so on.

The documents can include any stored information that is accessible or made accessible to the ML model 465. In general, the set of documents can include any document that the configuring user considers relevant to addressing queries relating to the topic. For example, documents relating to organizational policies may include any document that is accessible or indexable by the ML model 465 that includes information about past, present, or future organizational policies. As described in block 802 above, the query application 420 can be configured to make a distinction between internal and external documents, and to respond to queries accordingly.

At block 904, the query application 420 integrates the set of documents into a datastore 450. The datastore 450 is accessible by the ML model 465 that is trained to respond to natural-language queries based on the set of documents. Block 904 can proceed similarly to block 804 as described above.

At block 906, the query application 420 receives, from a client device, a query about the topic. For example, as described above with respect to block 806, the query about the topic may be input to a chat interface exposed by client software provided by the video conference provider 402, as shown in FIGS. 6 and 7. FIG. 5 depicts another embodiment of a chat interface 530 used in some examples.

In some examples, the query interface 710 can be accessed from various locations in a user interface provided by the video conference provider 402. For example, the video conference provider 402 may provide client software for video conferencing, messaging, chat, whiteboarding, calendaring, and so on. The user interface for those and other respective functions may include a control to access the query interface 710. The query interface 710 can thus provide a conversational interface that may be regarded by users as a "AI companion" or "digital assistant" that can be queried on wide range of topics, commensurate with the scope defined by the documents identified in block 902. However, as is discussed below, some example implementations can include information received from other sources such as web searches, database queries, document searches, and so on.

Queries about the topic may take any suitable form using natural language. With respect to the examples including upcoming meetings, organizational news, organizational policies, some example queries include "tell me about upcoming meetings for the Project Team," "briefly describe the new reorganization that Alice announced last week," or "tell me what changed in the employee handbook this quarter."

Another illustrative example includes queries that may be asked in the context of another user, similar to the process 800 described above with respect to FIG. 8. For instance, queries may request information to prepare for upcoming meetings, consolidated summaries of prior video conferences or chat threads involving the user, or information available in identified, indexable or searchable documents connected third-party applications. The documents from connected third-party applications may require explicit consent of the user to be included in the set of documents accessible to the ML model 465.

Yet another illustrative example includes queries that may be asked in the context of a video conference. For instance, queries posed during a video conference may direct the query application 420 to assist in generating a support ticket using third-party integrations or to summarize the video conference so far.

In some examples, the query application 420 can be configured to perform searches based on issues or questions raised during the video conference or in another context. In this case, the ML model 465 is configured to supplement the set of documents integrated into the datastore 450 with information obtained during web searches, database queries, and other means for obtaining information other than the set of documents. When the ML model 465 is thus configured, the query application 420 may utilize user interface elements such as highlighting or other means to draw attention to the portions of the query response that are based on information other than the set of documents. Additionally, the query application 420 may be configured with heightened security requirements when documents other than the set of documents are accessible by the ML model 465 to ensure that private or confidential information are not inadvertently shared beyond the desired scope.

In some examples, queries may be automatically generated. For example, following a video conference, the query application 420 can be configured to automatically generate a summary of the video conference, to identify action items, or to provide prompts or reminders to take certain actions following the video conference (e.g., email information about important decisions to managers).

At block 908, the query application 420 receives, from the machine learning model, a response to the query, in which the response is based on the set of documents. Block 908 can proceed similarly to block 808 as described above.

At block 910, the query application 420 outputs the response to the client device. Block 910 can proceed similarly to block 810 as described above.

Figure 10:
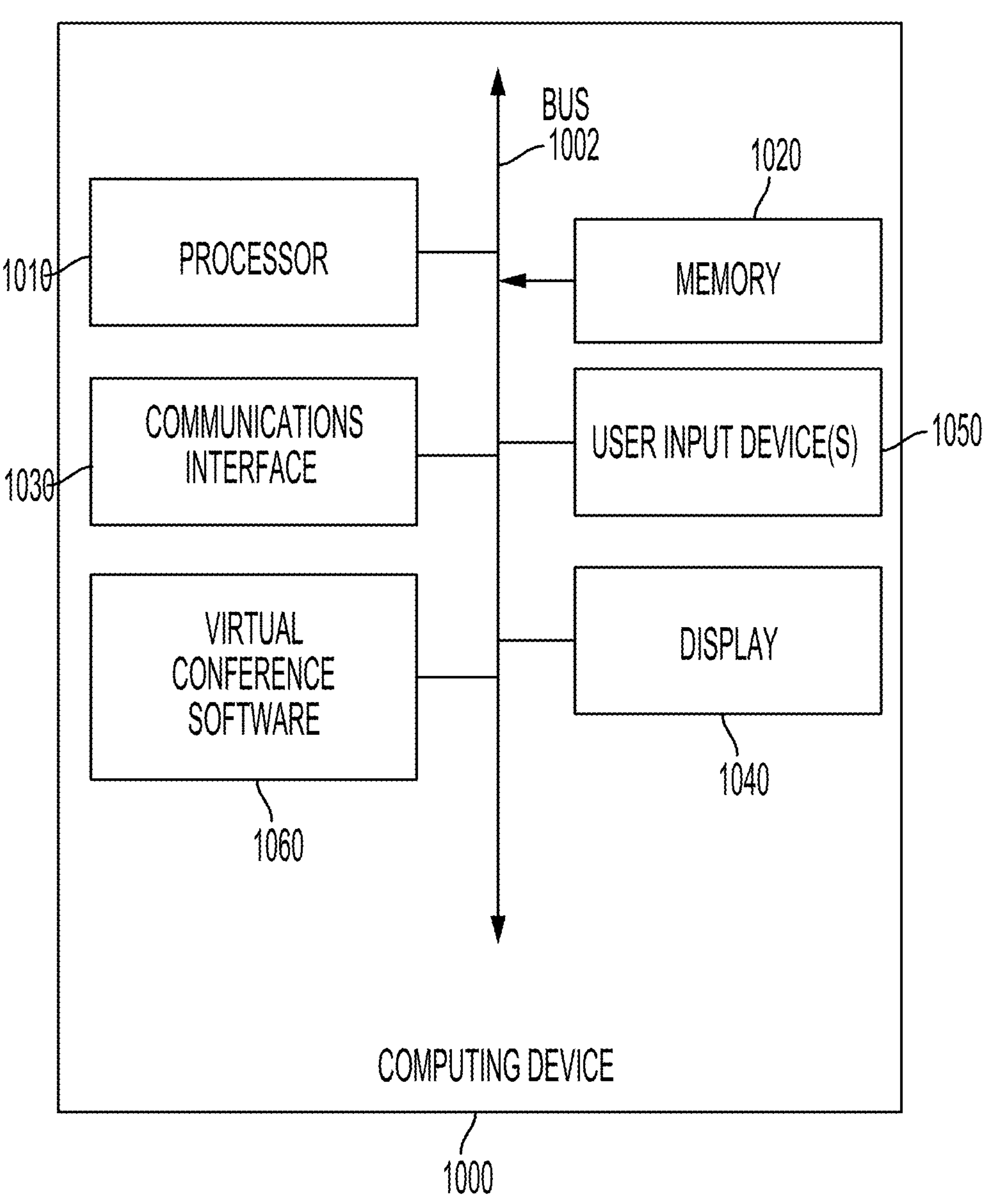
FIG. 10 shows an example computing device suitable for use in example systems or methods for providing techniques for scoped querying using customized artificial intelligence, according to some aspects of the present disclosure.

Referring now to FIG. 10, FIG. 10 shows an example computing device 1000 suitable for use in example systems or methods for providing scoped querying using customized artificial intelligence according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for scoped querying using customized artificial intelligence according to different examples, such as part or all of the example methods 800 and 900 described above with respect to FIGS. 8 and 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes virtual conferencing software 1060 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: determining a set of documents about a first user of a first client device of a plurality of client devices; integrating the set of documents into a datastore, the datastore accessible by a machine learning model trained to respond to natural-language queries based on the set of documents; receiving, from a second client device of the plurality of client devices, a query about the first user of the first client device; receiving, from the machine learning model, a response to the query, wherein the response is based on the set of documents; and outputting the response to the second client device.

Example 2 is the method of example(s) 1, further comprising joining the first client device and the second client device to a video conference, wherein the set of documents includes information about the video conference.

Example 3 is the method of example(s) 2, wherein: the query is input to the second client device during the video conference; and the information about the video conference includes a transcript of the video conference, wherein the transcript of the video conference is periodically updated during the video conference.

Example 4 is the method of example(s) 1, wherein: the query about the first user of the first client device is input to a chat interface; the query about the first user of the first client device is addressed to the first user of the first client device; and the response from the machine learning model is output to the chat interface; and the response from the machine learning model is addressed to a second user of the second client device.

Example 5 is the method of example(s) 1, wherein determining the set of documents about the first user of the first client device of the plurality of client devices comprises receiving an indication of a selection of one or more documents by the first user of the first client device.

Example 6 is the method of example(s) 5, wherein the selection of one or more documents comprises a first designation of a first number of internal documents and a second designation of a second number of external documents, and further comprising: determining that the second client device is an internal client device, wherein the response is based on the first number of internal documents; receiving, from a third client device of the plurality of client devices, a second query about the first user of the first client device; determining that the third client device is an external client device; receiving, from the machine learning model, a second response to the second query, wherein the second response is based on the second number of external documents; and outputting the second response to the third client device.

Example 7 is the method of example(s) 1, wherein the set of documents includes one or more documents generated by the first user of the first client device.

Example 8 is the method of example(s) 1, wherein the set of documents comprises at least one of emails, chat messages, video conference transcripts, or wiki pages.

Example 9 is the method of example(s) 1, further comprising: receiving an indication of an update to a document in the set of documents; and reintegrating the set of documents into the datastore using the updated document, wherein the response to the query is based on the updated set of documents.

Example 10 is the method of example(s) 1, further comprising: joining the first client device to a chat channel; determining a set of public chat channels that include the first client device; accessing, from the set of public chat channels, chat information; and integrating the chat information into the datastore, wherein the response to the query is further based on the chat information.

Example 11 is the method of example(s) 10, wherein the set of public chat channels correspond to a set of chat channels designated by the first user of the first client device.

Example 12 is the method of example(s) 1, wherein the machine learning model is a large language model.

Example 13 is the method of example(s) 12, wherein the set of documents are integrated into the datastore using retrieval-augmented generation.

Example 14 is the method of example(s) 1, further comprising: receiving, from the second client device, an indication to output the query to the first user of the first client device; and determining that the first user of the first client device is not available.

Example 15 is the method of example(s) 1, further comprising receiving, from the second client device, an indication of a user interface interaction for causing an output of the query to the first user of the first client device.

Example 16 is a non-transitory computer-readable medium storing instructions that, when executed by one or more processors, cause the one or more processors to perform operations including: determining a set of documents about a first user of a first client device of a plurality of client devices; integrating the set of documents into a datastore, the datastore accessible by a machine learning model trained to respond to natural-language queries based on the set of documents; receiving, from a second client device of the plurality of client devices, a query about the first user of the first client device; receiving, from the machine learning model, a response to the query, wherein the response is based on the set of documents; and outputting the response to the second client device.

Example 17 is the non-transitory computer-readable medium of example(s) 16, further comprising the operation: joining the first client device and the second client device to a video conference, and wherein: the set of documents includes information about the video conference; the query about the first user of the first client device is input to a chat interface accessible from the video conference; the query about the first user of the first client device is addressed to the first user of the first client device; the response from the machine learning model is output to the chat interface; and the response from the machine learning model is addressed to a second user of the second client device.

Example 18 is the non-transitory computer-readable medium of example(s) 16, further comprising the operation determining that the query is about a document not included in the set of documents, and wherein the response includes a refusal to answer the query based on the document not being included in the set of documents.

Example 19 is a system comprising: one or more processors; and one or more computer-readable storage media storing instructions which, when executed by the one or more processors, cause the one or more processors to perform operations including: determining a set of documents about a first user of a first client device of a plurality of client devices; integrating the set of documents into a datastore, the datastore accessible by a machine learning model trained to respond to natural-language queries based on the set of documents; receiving, from a second client device of the plurality of client devices, a query about the first user of the first client device; receiving, from the machine learning model, a response to the query, wherein the response is based on the set of documents; and outputting the response to the second client device.

Example 20 is the system of example(s) 19, further comprising the operation responsive to receiving an indication to query the first user of the first client device, causing the second client device to output a chat interface, and wherein: the query about the first user of the first client device is input to the chat interface; the query about the first user of the first client device is addressed to the first user of the first client device; the response from the machine learning model is output to the chat interface; and the response from the machine learning model is addressed to a second user of the second client device.

That which is claimed is:

1. A method, comprising:

determining a set of documents about a first user of a first client device of a plurality of client devices;

integrating the set of documents into a datastore, the datastore accessible by a machine learning model trained to respond to natural-language queries based on the set of documents;

receiving, from a second client device of the plurality of client devices, a query about the first user of the first client device;

receiving, from the machine learning model, a response to the query, wherein the response is based on the set of documents; and outputting the response to the second client device.

2. The method of claim 1, further comprising joining the first client device and the second client device to a video conference, wherein the set of documents includes information about the video conference.

3. The method of claim 2, wherein:

the query is input to the second client device during the video conference; and the information about the video conference includes a transcript of the video conference, wherein the transcript of the video conference is periodically updated during the video conference.

4. The method of claim 1, wherein:

the query about the first user of the first client device is input to a chat interface;

the query about the first user of the first client device is addressed to the first user of the first client device; and the response from the machine learning model is output to the chat interface; and the response from the machine learning model is addressed to a second user of the second client device.

5. The method of claim 1, wherein determining the set of documents about the first user of the first client device of the plurality of client devices comprises receiving an indication of a selection of one or more documents by the first user of the first client device.

6. The method of claim 5, wherein the selection of one or more documents comprises a first designation of a first number of internal documents and a second designation of a second number of external documents, and further comprising:

determining that the second client device is an internal client device, wherein the response is based on the first number of internal documents;

receiving, from a third client device of the plurality of client devices, a second query about the first user of the first client device;

determining that the third client device is an external client device;

receiving, from the machine learning model, a second response to the second query, wherein the second response is based on the second number of external documents; and outputting the second response to the third client device.

7. The method of claim 1, wherein the set of documents includes one or more documents generated by the first user of the first client device.

8. The method of claim 1, wherein the set of documents comprises at least one of emails, chat messages, video conference transcripts, or wiki pages.

9. The method of claim 1, further comprising:

receiving an indication of an update to a document in the set of documents; and reintegrating the set of documents into the datastore using the updated document, wherein the response to the query is based on the updated set of documents.

10. The method of claim 1, further comprising:

joining the first client device to a chat channel;

determining a set of public chat channels that include the first client device;

accessing, from the set of public chat channels, chat information; and integrating the chat information into the datastore, wherein the response to the query is further based on the chat information.

11. The method of claim 10, wherein the set of public chat channels correspond to a set of chat channels designated by the first user of the first client device.

12. The method of claim 1, wherein the machine learning model is a large language model.

13. The method of claim 12, wherein the set of documents are integrated into the datastore using retrieval-augmented generation.

14. The method of claim 1, further comprising:

receiving, from the second client device, an indication to output the query to the first user of the first client device; and determining that the first user of the first client device is not available.

15. The method of claim 1, further comprising receiving, from the second client device, an indication of a user interface interaction for causing an output of the query to the first user of the first client device.

16. A non-transitory computer-readable medium storing instructions that, when executed by one or more processors, cause the one or more processors to perform operations including:

determining a set of documents about a first user of a first client device of a plurality of client devices;

integrating the set of documents into a datastore, the datastore accessible by a machine learning model trained to respond to natural-language queries based on the set of documents;

receiving, from a second client device of the plurality of client devices, a query about the first user of the first client device;

receiving, from the machine learning model, a response to the query, wherein the response is based on the set of documents; and outputting the response to the second client device.

17. The non-transitory computer-readable medium of claim 16, further comprising the operation:

joining the first client device and the second client device to a video conference, and wherein:

the set of documents includes information about the video conference;

the query about the first user of the first client device is input to a chat interface accessible from the video conference;

the query about the first user of the first client device is addressed to the first user of the first client device;

the response from the machine learning model is output to the chat interface; and the response from the machine learning model is addressed to a second user of the second client device.

18. The non-transitory computer-readable medium of claim 16, further comprising the operation determining that the query is about a document not included in the set of documents, and wherein the response includes a refusal to answer the query based on the document not being included in the set of documents.

19. A system comprising:

one or more processors; and one or more computer-readable storage media storing instructions which, when executed by the one or more processors, cause the one or more processors to perform operations including:

determining a set of documents about a first user of a first client device of a plurality of client devices;

integrating the set of documents into a datastore, the datastore accessible by a machine learning model trained to respond to natural-language queries based on the set of documents;

receiving, from a second client device of the plurality of client devices, a query about the first user of the first client device;

receiving, from the machine learning model, a response to the query, wherein the response is based on the set of documents; and outputting the response to the second client device.

20. The system of claim 19, further comprising the operation responsive to receiving an indication to query the first user of the first client device, causing the second client device to output a chat interface, and wherein:

the query about the first user of the first client device is input to the chat interface;

the query about the first user of the first client device is addressed to the first user of the first client device;

the response from the machine learning model is output to the chat interface; and the response from the machine learning model is addressed to a second user of the second client device.

* * * * *